Feb. 5, 1963 R. BECKER 3,076,318
PROCESS FOR THE DECOMPOSITION OF GAS
Filed Nov. 19, 1959 3 Sheets-Sheet 1

Inventor:
Rudolf Becker,
By Pierce, Scheffler & Parker
his Attorneys

United States Patent Office 3,076,318
Patented Feb. 5, 1963

3,076,318
PROCESS FOR THE DECOMPOSITION OF GAS
Rudolf Becker, Munich-Solln, Germany, assignor to Gesellschaft für Linde's Eismaschinen Aktiengesellschaft, Hollriegelskreuth, near Munich, Germany, a company of Germany
Filed Nov. 19, 1959, Ser. No. 854,037
Claims priority, application Germany Nov. 21, 1958
18 Claims. (Cl. 62—11)

This invention relates to the art of separating gaseous mixtures into their components by procedures involving low-temperature cooling, and more particularly is concerned with an improved process of, and apparatus for, separating the components of coke oven gas or separately recovering ethylene and carbon dioxide from a gaseous mixture containing the same.

The known processes for separating coke oven gas by means of regenerators are operated primarily at 6 to 8 atmospheres absolute, because pressures of this order are economical and easy to control. Thus, for example, in a known process during the loading period thereof the crude gas is pre-cooled and the pre-cooled crude gas is introduced, under a pressure of 8 atmospheres absolute, into a regenerator where it is cooled to 125° K. The indicated temperature is so selected that, in addition to the $CO_2$, possibly all of the ethylene is condensed and retained in the regenerator, while as little methane as possible is condensed. In the second switching period, i.e., the unloading period, the regenerator which has just been charged is connected to a vacuum pump, which latter removes the condensates from the regenerator. The crude ethylene fraction thus obtained cannot be used, however, in this form. First, there must be removed the carbon dioxide which is present in an amount of about 25% in the crude ethylene fraction. Various methods are available for this purpose; for example, washing with potash-, ammonia-, or amine-washing liquors, which are used where inexpensive heating is possible. Washing with pressure water, on the other hand, will be used where these prerequisites are missing. Care has to be taken that the wash water is well degasified and that the ethylene-containing coke-oven gas is recovered, so that there are no ethylene losses. Only then can the ethylene fraction be worked up to pure ethylene. As by-products there are obtained benzene, $C_4$-$C_5$-hydrocarbons, propylene, ethane, and methane.

It is an object of the present invention to provide an improved process for separating gas mixtures such as those above referred to. In particular, expensive modes of purifying the crude ethylene fraction are avoided. This can be achieved, according to the basic concept of the invention, by the technical exploitation of the fact that the vapor pressure curve of $CO_2$, represented on a logarithmic scale, is steeper than that of ethylene (see FIG. 1), so that a drop in temperature results in a great decrease of the ratio $p_{CO_2}/p_{C_2H_4}$.

For the solution of the problem it is proposed according to the invention to eliminate two components separately from a gas mixture where the higher boiling component has a steeper vapor pressure curve than has the lower boiling component, particularly $CO_2$ and ethylene. The method is characterized in that $CO_2$ and ethylene are condensed in fractions at low pressures below 6 atmospheres—for example, at 1.2 to 5 atmospheres, preferably under 2 atmospheres—and then evaporated separately.

The invention will be described more fully on the basis of a comparison between a known process and the process according to the invention.

In a process belonging to the known state of technology, which works at 8 atmospheres absolute, the $CO_2$ begins to condense at about 190° K., and has been substantially completely separated at about 150° K. The ethylene condensation takes place in this case between 180° and 125° K. If, as can be seen from FIG. 2, the amount of the coke oven gas constituents condensed from 20,000 Nm.³ coke oven gas at the respective temperature in Nm.³ (ordinate) is plotted against the corresponding condensation temperature in degrees K. (abscissa), one obtains the solid curves for $CO_2$ and ethylene at a coke oven gas pressure of 9 atmospheres. It will be seen that with 95% separation of $CO_2$ (550 Nm.³ $CO_2$, and about 150° K.), 100 Nm.³ ethylene have also been condensed at the same time, so that—due to the relatively flat curves—only a relatively insufficient separation of carbon dioxide and ethylene is possible.

As will be seen from the following considerations, the carbon dioxide content of the coke oven gas at the ethylene dew point depends on the ratio of the vapor pressures of carbon dioxide and ethylene and on the ethylene content.

The vapor pressure $(p_{C_2H_4})TK$ of ethylene at its dew point temperature TK is:

$$(p_{C_2H_4})TK = (x_{C_2H_4})TK \cdot P$$

The vapor pressure of carbon dioxide at the same temperature is:

$$p_{CO_2} = x_{CO_2} \cdot P$$

wherein $(x_{C_2H_4})TK$ is the ethylene content in the coke oven gas, $x_{CO_2}$ is the carbon dioxide content at the ethylene dew point, and P is the total pressure. By combining the two equations one obtains for $x_{CO_2}$ the value:

$$x_{CO_2} = \frac{(x_{C_2H_4})TK \cdot p_{CO_2}}{(p_{C_2H_4})TK}$$

The carbon dioxide content at the ethylene dew point is, thus, the lower, the smaller is the vapor pressure ratio $P_{CO_2}/(p_{C_2H_4})TK$ and the lower the ethylene content is in the coke oven gas.

Figure 1:
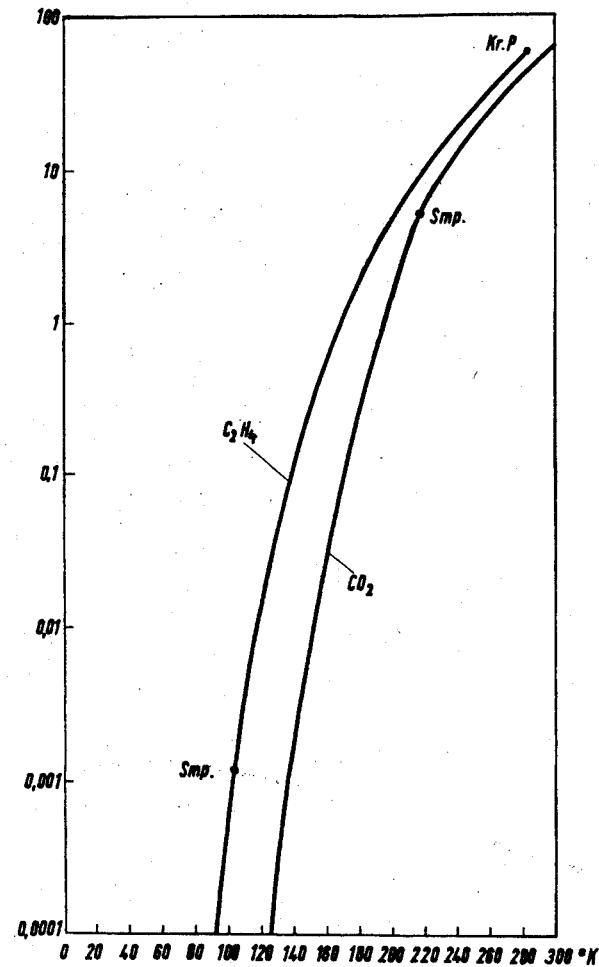
FIGURE 1 represents a plot of the vapor pressure curves of sample components used in accordance with the invention, and plotted as a function of temperature variation.

As can be seen from the vapor pressure curves of $CO_2$ and ethylene shown in FIG. 1, the vapor pressure ratio decreases greatly with dropping temperature. The process according to the invention makes it possible to utilize this effect technically. The discovery on which this invention is based essentially consists in that, on the basis of this effect, the ethylene starts to condense at low pressure only at temperatures at which the $CO_2$ has been practically completely separated.

On the one hand it follows, from the above-stated considerations, that the ratio of the vapor pressure of $CO_2$ and ethylene is to be kept as small as possible. On the other hand, it will be apparent, from the observation of the vapor pressure curves, that this ratio diminishes greatly with dropping temperature. It follows, therefore, that if the ethylene dew point temperature is selected lower than heretofore, a significant improvement of the selectivity can be achieved. In order to reduce the ethylene dew point, the pressure of the coke oven gas is reduced to 1.2–5 atmospheres—preferably to 1.5–2 atmospheres. Since according to the above considerations the ethylene content of the crude gas also influences the $CO_2$ content at the ethylene dew point, starting gases with a low ethylene content—for example, 1–8%, preferably 1.5–2.5%—are selected. The vapor pressure ratio $p_{CO_2}/p_{C_2H_4}$ for various temperatures is compiled in the following table:

Table 1

| T., °K.: | $p_{CO_2}/p_{C_2H_4}$ |
|---|---|
| 170 | 0.1 |
| 150 | 0.03 |
| 140 | 0.018 |
| 130 | 0.008 |
| 120 | 0.0033 |

Figure 2:
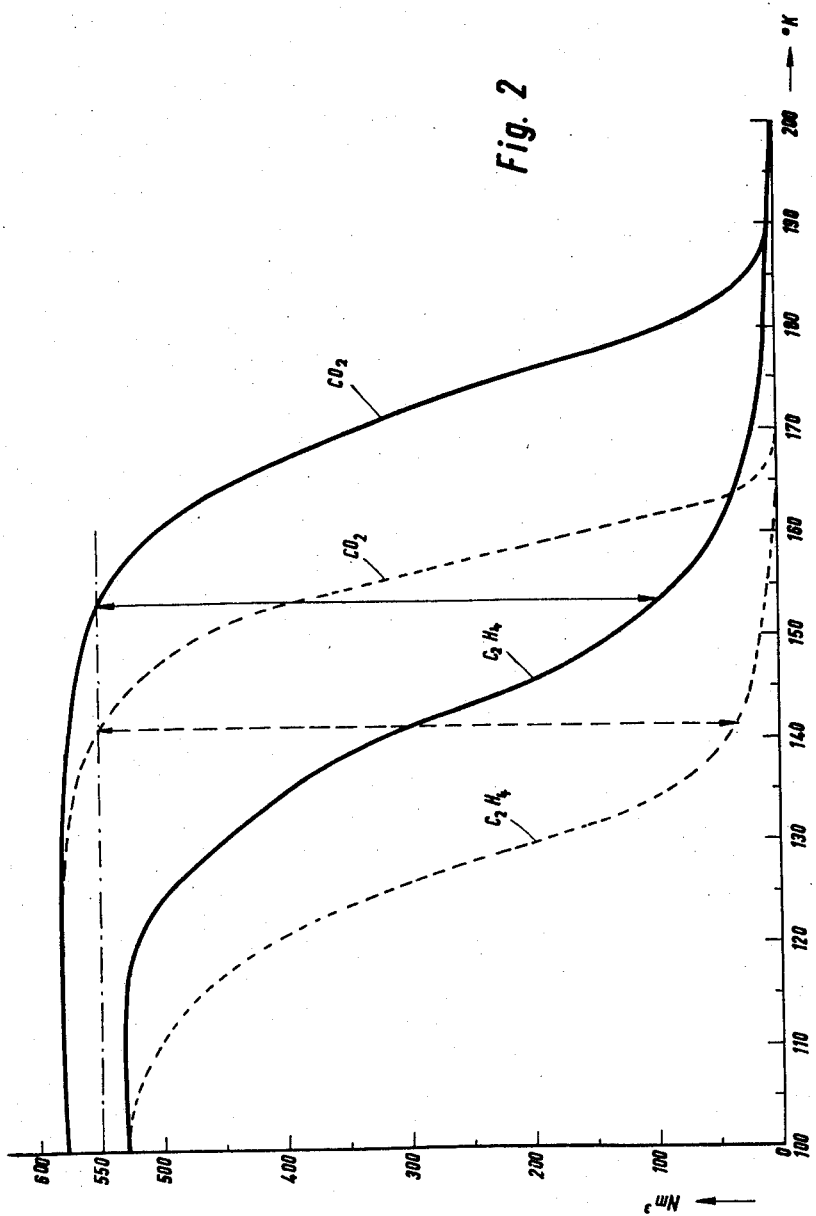
FIGURE 2 represents a separation curve for the constituents of coke oven gas, and plotted as a function of condensation temperature.

This behavior also manifests itself in the broken curves shown in FIG. 2, which curves apply to a gas mixture containing 2.65% ethylene at 1.6 atmospheres. A 95% separation of $CO_2$ is achieved here at about 140° K. In contrast to the known processes working at 9 atmospheres, however, only about 40 Nm.³ (7.5%), ethylene have been condensed together with the $CO_2$. At 1.6 atmospheres the liquefaction of the components thus starts at a lower temperature, the curves rise a little steeper, and one has thus the possibility of obtaining the individual constituents in fractions of a higher purity.

The $C_2$-fraction obtained in the above-described process can be used directly for the purification of ethylene and ethane. The expensive and cumbersome removal of $CO_2$ is thus eliminated. This results in a considerable reduction in the cost of the ethylene preparation.

Another advantage of this process consists in that pressure-free gases and gases with a low ethylene content can also be used without any additional expenditure for the preparation of ethylene.

The invention is not limited to the components pair $CO_2$—$C_2H_4$. The decomposition of a gas mixture by fractional condensation at low pressures is always successful when the dew point temperature of the lower boiling components drops into the temperature range where the ratio between the vapor pressure of the higher boiling component and that of the lower boiling component has become so small that the desired selectivity is achieved. Thus, for example, gas mixtures consisting essentially of the components pairs: acetylene and ethylene; $H_2S$ and acetylene; $H_2S$ and ethane; can be separated in this manner. Correspondingly, the process is applicable not only to coke oven gas but also, for example, for separating reform gas, or for the treatment of a mixture of reform gas and coke oven gas, or merely for the separation of ethane from natural gas.

Figure 3:
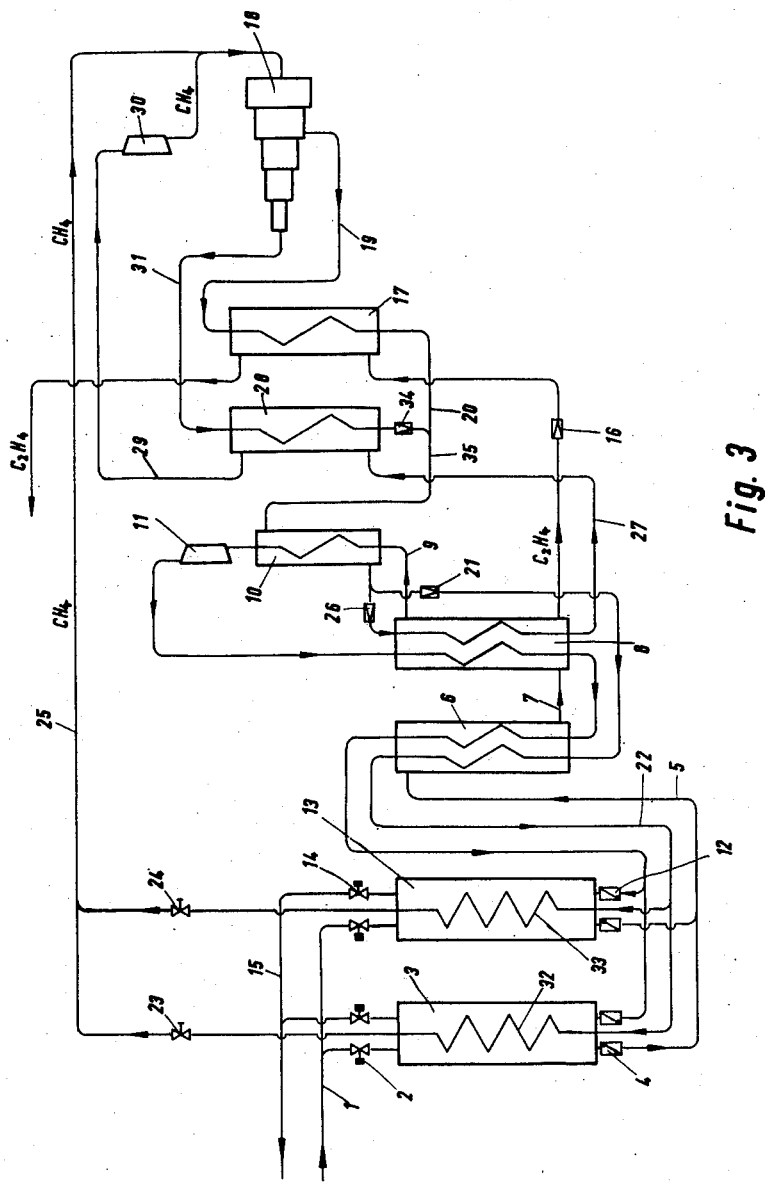
FIGURE 3 represents a process flow diagram illustrating a preferred apparatus set-up.

The process according to the invention will be described by way of example on the basis of FIG. 3. Coke oven gas enters, under a pressure of 1.6 atmospheres, through conduit 1 and valve 2, into the regenerator 3, where it is cooled to about 140° K. As already mentioned, the separation is the better the lower is the ethylene dew point and the coke oven gas pressure, respectively. At the indicated temperature, about 95% $CO_2$ are retained in the regenerator; likewise, all higher hydrocarbons and less than 10% of the ethylene and ethane. Over the relief valve 4 and the conduit 5 the gas flows into the condenser 6, and through the conduit 7 into the condenser 8. In these two countercurrent condensers the gas is cooled to about 105° K., whereby the ethylene and ethane are liquefied. The amount of $CO_2$ flowing with the ethylene into the condensers 6 and 8 must be so small that substantially no solid $CO_2$ is obtained in the condensation or in the re-evaporation. About 20% methane is dissolved in the $C_2$-liquid. The gaseous constituents are introduced through the conduit 9 into the heat exchanger 10 where they are heated by several degrees so that there is no liquefaction during the ensuing expansion in the turbine 11. This turbine generates the major part of the cold necessary for maintaining the stated low temperatures. The expanded gas flows back through the heat exchangers 8 and 6 (return leg), and arrives through the valve 12 in the regenerator 13, cools the latter, and flows through the valve 14 and conduit 15 into the open air. The two regenerators 3 and 13 are operated alternately in the manner represented in the drawing. The ethylene liquefied in the condensers 6 and 8 accumulates in the sump of the condenser 8, is expanded through valve 16 to atmospheric pressure and evaporated in the condenser 17 and heated to ambient temperature. The result is a $C_2$-fraction with almost 75% ethane plus ethylene. This gas can be processed, in inexpensive manner, into pure ethylene and pure ethane.

If larger amounts of ethylene have to be condensed, the ethylene separated in the regenerator must not be neglected. In this case the ethylene deposited at the cold end of the regenerator after the loading period can be evaporated by pressure reduction and collected separately. If necessary, this process can be enhanced by scavenging gas. The $CO_2$ is removed from the regenerator in very small quantities by separately evaporating the same.

A methane cycle is provided for the liquefaction of the ethylene fraction and its re-evaporation. The methane current effecting the evaporation of the liquid ethylene should be under a pressure of 25–50 atmospheres. A heat exchanger is provided for utilizing the cold of the expanded methane, in which exchanger the expanded, cold, methane is in counterflow with a methane current under a pressure of 100–200 atmospheres absolute.

The following process steps are provided for the methane cycle:

A compressor compresses the methane partly to 35 atmospheres absolute and partly to 200 atmospheres absolute. The medium pressure methane arrives by way of the conduit 19 at the condenser 17 where it evaporates and heats the ethylene fraction. The medium pressure methane, which leaves the heat exchanger 17 through the conduit 20, now combines with the methane flowing in the conduit 31, and in the tubular coil of the heat exchanger 28, and is expanded in the valve 34, so that a current of liquid methane flows through the conduit 35 into the heat exchanger 10 where it is super-cooled by the non-liquefied coke oven gas. After leaving the condenser 10, the methane current is divided: one part is expanded through the valve 21 to about 2 atmospheres, evaporates in th countercurrent condenser 6, and is then conducted, by way of the conduit 22, through two tubular coils 32 and 33 connected in parallel, which coils are provided for cooling the two regenerators. After passing through the valves 23 and 24 respectively, the methane flows through the conduit 25 back to the compressor 18. The second part of the methane is expanded by the valve 26, evaporates in the heat exchanger 8 under sub-atmospheric pressure (about 0.6 atmosphere), and is heated there. It arrives by way of the conduit 27 in the heat exchanger 28 where it gives up its cold to the methane entering through the conduit 31 and compressed to 200 atmospheres absolute, and flows then through the conduit 29 and the vacuum pump 30 back to the compressor 18.

In this case, only ethane and methane can be obtained as by-products in the preparation of crude ethylene.

I claim:

1. Process for the separate elimination of two components from a gas mixture in which the higher boiling component has a steeper vapor pressure curve (abscissa-temperature: ordinates—log p) than that of the lower boiling component, characterized in that said components are condensed in fractions at lower pressure, below 6 atmospheres, and then are evaporated separately.

2. Process for the separate elimination of carbon dioxide and ethylene from a gas mixture containing the same, which comprises condensing the carbon dioxide and the ethylene in fractions at a pressure within the range 5.0–1.2 atmospheres, and then separately evaporating the carbon dioxide and the ethylene.

3. Process for the separate elimination of carbon dioxide and ethylene from a gas mixture containing the same, which comprises condensing the carbon dioxide and the ethylene in fractions at a pressure within the range 2.0–1.5 atmospheres, and then separately evaporating the carbon dioxide and the ethylene.

4. Process according to claim 2, characterized in that the starting gas has an ethylene content of 1–8%.

5. Process according to claim 3, in which the starting gas has an ethylene content of from about 1.5 to about 2.5%.

6. Process according to claim 2, characterized in that the ethylene deposited, during a loading period, at the cold end of the regenerator provided for the separation of $CO_2$ is evaporated again by pressure reduction after the said loading period.

7. Process according to claim 6, characterized in that the process is enhanced by scavenging gas.

8. Apparatus for separately eliminating two components from a gas mixture containing them in which the higher boiling component has a steeper vapor pressure curve than that of the lower boiling component, said separate elimination procedure involving fractional condensation of said components at a pressure below 6 atmospheres followed by separate evaporation of the condensed components, characterized in that two countercurrent condensers (6, 8) used for the liquefaction of the lower boiling component, are connected in series with two alternately operated regenerators (3, 13).

9. Apparatus as defined in claim 8, characterized in that two regenerators (3) and (13) are provided with two tubular coils (32) and (33) respectively connected in parallel.

10. Apparatus as defined in claim 9, characterized in that a methane current under a pressure of about 2 atmospheres is used, as a coolant for the tubular coils (32, 33) and the countercurrent condenser (6); for the countercurrent condensers (8) a methane current evaporating under partial vacuum (about 0.6 atmosphere) and at the same time for both countercurrent condensers as well as for one of the two regenerators the residual gas expanded in an expansion turbine.

11. Apparatus according to claim 10, characterized in that the methane current effecting the evaporation of the liquid ethylene in a heat exchanger (17) is under a pressure of 25–50 atmospheres, preferably 35 atmospheres.

12. Apparatus according to claim 10, characterized in that a heat exchanger (28) having a pipe system for a methane coolant current is provided for the utilization of the cold of the methane after it has been expanded through an expansion valve (26), the pipe system of this heat exchanger containing a methane current under a pressure of 100–200 atmospheres which is expanded by a valve (34), to 25–50 atmospheres, and which can be combined in a conduit (35) with the methane issuing from the heat exchanger (17).

13. Apparatus according to claim 12, characterized in that a heat exchanger (10) is provided for utilizing the cold of the residual gas issuing from the countercurrent condenser (8), in which the cold of the residual gas can be transferred to the methane current arriving from the conduit (35).

14. Apparatus according to claim 13, characterized in that the conduit carrying the methane current arriving from the heat exchanger (10), and opening by way of a throttle valve (26) into the countercurrent condenser (8), is provided immediately behind the heat exchanger (10) with a branch having a throttle valve (21) and leading into the countercurrent condenser (6).

15. Process for the separate elimination of carbon dioxide and ethylene from a gas mixture containing the same, which comprises condensing the carbon dioxide and the ethylene in fractions at a pressure within the range 5.0–1.2 atmospheres, and then separately evaporating the carbon dioxide and the ethylene, the process being further characterized in that a methane current is provided for the liquefaction of the ethylene fraction and for its subsequent evaporation, and in which the methane cycle comprises the following steps: compressing a first part of the methane to from about 25 to about 50 atmospheres and a second part of the methane to about 200 atmospheres; passing said first part in indirect heat-exchanging relation with the ethylene fraction wherein said first part of methane is evaporated; passing said second part through a heat-exchanger in indirect heat-exchanging relation with a methane current, thereupon expanding said second part to about 0.6 atmosphere and combining the so-expanded second part with said first part; passing the combined first and second parts of methane in indirect heat-exchanging relationship with a supercooled non-liquefiable component of said gas mixture whereby the methane is liquefied; expanding one part of the so-liquefied methane to about 2 atmospheres and thereupon passing the expanded part in indirect heat-exchange with said ethylene fraction, and thereafter in indirect heat-exchange with said initial gas mixture and finally returning to said compressing step.

16. Process as defined in claim 15, in which said first part of methane is compressed to about 35 atmospheres before being passed in indirect heat-exchanging relation with the ethylene fraction.

17. Apparatus for separately eliminating two components from a gas mixture containing them, in which mixture the higher boiling component has a steeper vapor pressure curve than that of the lower boiling component, said separate elimination procedure involving fractional condensation of said components followed by separate evaporation of the condensed components, said apparatus comprising
a first, a second and a third heat-exchanger,
a main countercurrent cooler-condenser having a first and a second return passage therethrough,
passage means communicating between each of said heat-exchangers and the interior of said cooler-condenser,
a passageway including an expansion valve communicating between the foot of the cooler-condenser and said first return passage,
a turbine for expanding a residual gas,
a residual gas conduit communicating between the head of said cooler-condenser and said turbine and thence to said second return passage, ducts separately communicating between said first return passage and each of said heat-exchangers, and ducts separately communicating between said second return passage and each of said heat-exchangers.

18. Apparatus as defined in claim 17,
further characterized in that
said passage means includes
a preliminary countercurrent cooler-condenser arranged in series with and preceding said main cooler-condenser.

References Cited in the file of this patent

UNITED STATES PATENTS

| 2,632,316 | Eastman | Mar. 24, 1953 |
| 2,712,738 | Wucherer | July 12, 1955 |
| 2,784,572 | Wucherer | Mar. 12, 1957 |
| 2,785,548 | Becker | Mar. 19, 1957 |
| 2,823,523 | Eakin | Feb. 18, 1958 |
| 2,836,040 | Schilling | May 27, 1958 |